US008254505B2

United States Patent
Tsuie

(10) Patent No.: US 8,254,505 B2
(45) Date of Patent: Aug. 28, 2012

(54) NARROW-BAND INTERFERENCE DETECTOR, SIGNAL RECEIVER EMPLOYING NARROW-BAND INTERFERENCE DETECTOR AND CONTROLLING DEMODULATOR PARAMETER SETTING ACCORDING TO NARROW-BAND INTERFERENCE DETECTION RESULT, AND RELATED METHODS THEREOF

(75) Inventor: Yih-Ming Tsuie, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 400 days.

(21) Appl. No.: 12/621,455

(22) Filed: Nov. 18, 2009

(65) Prior Publication Data

US 2011/0116536 A1     May 19, 2011

(51) Int. Cl.
*H03D 1/04*     (2006.01)
(52) U.S. Cl. ...................................................... 375/346
(58) Field of Classification Search ................... 375/346
See application file for complete search history.

(56) References Cited

U.S. PATENT DOCUMENTS

| 6,426,983 | B1 * | 7/2002 | Rakib et al. | 375/346 |
| 2004/0091039 | A1 * | 5/2004 | Xia et al. | 375/233 |
| 2005/0047487 | A1 * | 3/2005 | Sakaue et al. | 375/148 |
| 2005/0047497 | A1 * | 3/2005 | Rubinstain et al. | 375/222 |
| 2006/0239342 | A1 * | 10/2006 | Amizic et al. | 375/233 |
| 2007/0009011 | A1 * | 1/2007 | Coulson | 375/144 |
| 2008/0107168 | A1 * | 5/2008 | Xia et al. | 375/233 |
| 2009/0285343 | A1 * | 11/2009 | Kolze et al. | 375/346 |
| 2010/0118849 | A1 * | 5/2010 | Kimura | 370/338 |
| 2011/0085629 | A1 * | 4/2011 | Lindoff et al. | 375/350 |

* cited by examiner

*Primary Examiner* — Juan A Torres
(74) *Attorney, Agent, or Firm* — Winston Hsu; Scott Margo

(57) ABSTRACT

A signal receiver includes a demodulator, a narrow-band interference detector, and a control module, where the demodulator is for performing signal demodulation upon a received communication signal, the narrow-band interference detector is for performing narrow-band interference detection and accordingly generating a detection result, and the control module is for controlling an operation of the demodulator according to the detection result. In addition, a narrow-band interference detector includes an input port and a processing circuit, where the input port is coupled to an equalizer included in a signal receiver for receiving a signal generated from the equalizer, and the processing circuit is coupled to the input port for performing a narrow-band interference detection according to the signal generated from the equalizer, and accordingly generating a detection result.

28 Claims, 5 Drawing Sheets

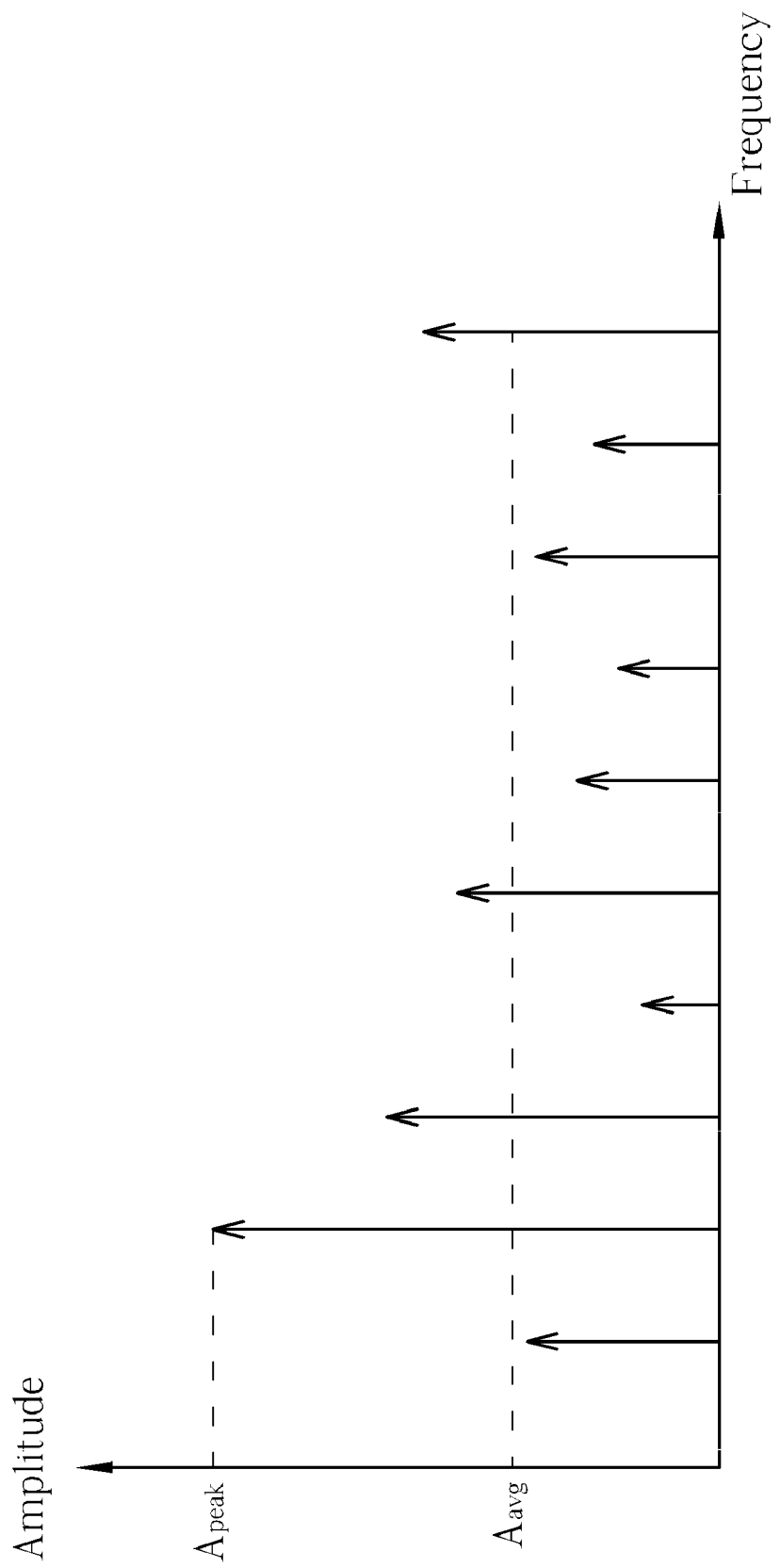

NARROW-BAND INTERFERENCE DETECTOR, SIGNAL RECEIVER EMPLOYING NARROW-BAND INTERFERENCE DETECTOR AND CONTROLLING DEMODULATOR PARAMETER SETTING ACCORDING TO NARROW-BAND INTERFERENCE DETECTION RESULT, AND RELATED METHODS THEREOF

BACKGROUND

The disclosed embodiments of the present invention relate to demodulating a received communication signal, and more particularly, to a narrow-band interference detector for performing a narrow-band interference detection according to a signal generated from an equalizer, a signal receiver employing a narrow-band interference detector and controlling demodulator parameter setting according to a narrow-band interference detection result, and related methods thereof.

When a customer gets his/her TV set, channel scan is usually the first action enabled by the customer to search the program channels available from the service provider. In general, the channel scan time is typically an important index of the channel acquisition performance of a demodulator included in a signal receiver of the TV set. Taking a TV set with a signal receiver devised for receiving a digital cable TV signal for example, a non-data aided (NDA) acquisition is required as there is no training signal provided from the service provider, and a decision-directed (DD) acquisition would take place of the NDA acquisition if the NDA acquisition converges and the output signal-to-noise ratio (SNR) is high enough. However, as the signal receiver may confront different reception conditions, a default demodulation configuration/parameter setting of the demodulator cannot cope with all of the possible reception conditions. For example, the reception of the digital cable TV signal may be affected by multipath interference, phase noise, burst noise, adjacent channel interference, co-channel interference, etc. In a conventional design, the receiver has a plurality of predefined candidate demodulation parameter settings stored therein, and employs a time-out mechanism to change the demodulation parameter setting utilized by the demodulator. More specifically, a system controller of the receiver selects one of the predefined candidate demodulation parameter settings to configure the demodulator, and if the demodulator configured by the selected demodulation parameter setting fails to successfully decode the received signal within a predefined elapsed time (i.e., a predefined time-out period), the system controller will select another predefined candidate demodulation parameter setting to configure the demodulator, and the demodulator configured by the new demodulation parameter setting will decode the received signal again. In other words, each time the time-out period is expired and the signal reception failure occurs, the system controller will configure the demodulator by a new demodulation parameter setting selected from the predefined candidate demodulation parameter settings. The time-out mechanism is operative to change the demodulation parameter setting of the demodulator until the signal reception is successful under the current reception condition.

As one can observe, the performance of the time-out mechanism depends on the length of the predefined time-out period (i.e., the allowable elapsed time for one signal reception session incorporated with a selected candidate demodulation parameter setting). In a case where the time-out period is too long, it may result in unpleasant channel change experience and unacceptable channel scan time. In another case where the time-out period is too short, the receiver may miss some achievable reception chances, leading to a reduced number of program channels that are identified by the channel scan operation.

In view of above, there is a need for an improved time-out mechanism which can dynamically adjust the time-out period for achieving optimized signal reception performance of a signal receiver (e.g., a digital cable TV receiver).

SUMMARY

According to a first aspect of the present invention, an exemplary signal receiver is disclosed. The exemplary signal receiver includes: a demodulator, for performing signal demodulation upon a received communication signal; a narrow-band interference detector, for performing narrow-band interference detection and accordingly generating a detection result; and a control module, coupled to the demodulator and the narrow-band interference detector, for controlling an operation of the demodulator according to the detection result.

According to a second aspect of the present invention, an exemplary narrow-band interference detector is disclosed. The exemplary narrow-band interference detector includes: an input port, coupled to an equalizer, for receiving a signal generated from the equalizer; and a processing circuit, coupled to the input port, for performing narrow-band interference detection according to the signal generated from the equalizer, and accordingly generating a detection result.

According to a third aspect of the present invention, an exemplary signal receiving method is disclosed. The exemplary signal receiving method includes: utilizing a demodulator to perform signal demodulation upon a received communication signal; performing narrow-band interference detection and accordingly generating a detection result; and controlling the signal demodulation according to the detection result.

According to a fourth aspect of the present invention, an exemplary method for detecting narrow-band interference is disclosed. The exemplary method includes: receiving a signal generated from an equalizer; and performing narrow-band interference detection according to the signal generated from the equalizer and accordingly generating a detection result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a spectrum diagram of a fast Fourier transform result of the signal generated from the equalizer shown in FIG. 1.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
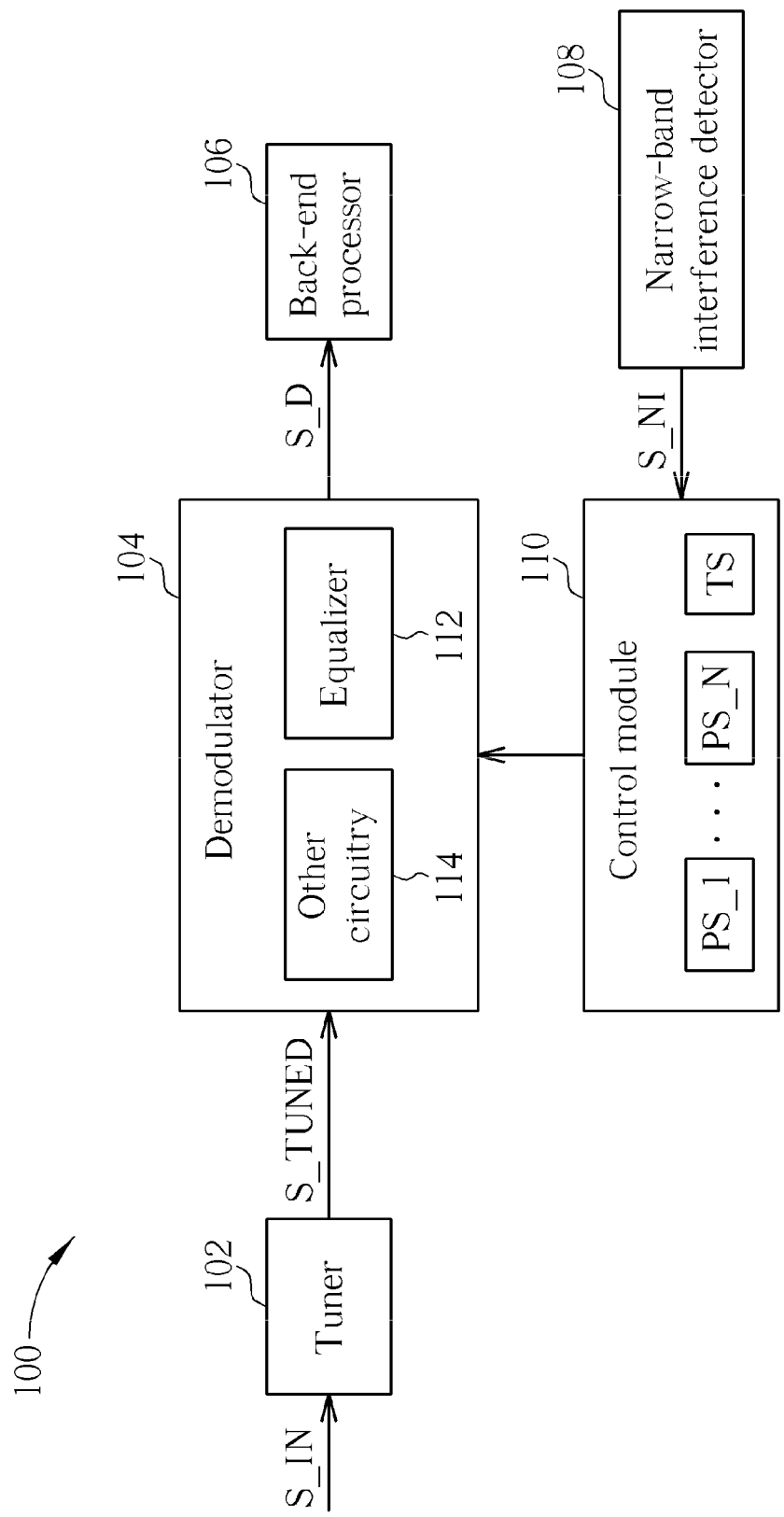
FIG. 1 is a block diagram of a signal receiver according to an exemplary embodiment of the present invention.

FIG. 1 is a block diagram of a signal receiver 100 according to an exemplary embodiment of the present invention. The signal receiver 100 includes, but is not limited to, a tuner 102, a demodulator 104, a back-end processor 106, a control module 110, and a narrow-band interference detector 108. In one implementation, the signal receiver 100 may be a digital cable TV receiver; however, this is for illustrative purposes only, and is not meant to be a limitation to the scope of the present invention. Any signal receiver having technical features of the proposed receiver architecture of the present invention should fall within the scope of the present invention. The tuner 102 may include a tracking filter, a mixer, and a saw filter for generating a received communication signal S_TUNED of a selected channel according to an incoming communication signal S_IN, such as a digital cable TV signal. The demodulator 104 is utilized for performing demodulation upon an analog signal (e.g., the received communication signal S_TUNED) to convert the analog signal into a digital bitstream S_D. The demodulator 104 contains an equalizer 112 and other circuitry 114 including, for example, an analog front-end processing circuit, an analog-to-digital converter (ADC), an automatic gain control (AGC), a digital front-end processing circuit, a timing synchronization circuit, a carrier synchronization circuit, a de-interleaver, a forward error correction (FEC) circuit, etc. The back-end processor 106 is for processing the digital bitstream S_D to derive the video/audio contents carried by the digital bitstream S_D. For example, the back-end processor 106 may include an MPEG decoder for decoding the digital bitstream S_D generated from the demodulator 104.

It is possible that the signal receiver 100 is affected by narrow-band interference, which may seriously degrade the channel change/channel scan performance. For example, the narrow-band interference may arise due to tuner mixer intermodulation (so-called analog co-channel interference) and/or ADC sampling of printed circuit board (PCB) spurs. To properly cope with the confronted reception condition, the narrow-band interference detector 108 is therefore devised for performing a robust narrow-band interference detection and accordingly generating a detection result S_NI, and the control module 110, which may be implemented using hardware or software, is coupled to the demodulator 104 and the narrow-band interference detector 108 for controlling the operation of the demodulator 104 according to the detection result S_IN. More specifically, provided that the signal receiver 100 is a digital cable TV receiver, the control module 110 implemented in the digital cable TV receiver controls the channel acquisition flow according to the detection result S_IN, thereby achieving quick demodulation parameter convergence in response to channel change.

To put it simply, the control module 110 configures the demodulator 104 according to a current candidate parameter setting selected from a plurality of candidate parameter settings PS_1-PS_N, and allows the demodulator 104 configured by the current candidate parameter setting to accomplish the signal demodulation (e.g., signal reception) within a time-out period TS. When the demodulator 104 configured by the current candidate parameter setting fails to accomplish the signal demodulation within the time-out period TS, the control module 110 selectively adjusts the time-out period TS according to the detection result S_NI. By way of example, but not limitation, when the demodulator 104 configured by the current candidate parameter setting fails to accomplish the signal demodulation within the time-out period TS and the detection result S_NI indicates that there is no narrow-band interference detected, the demodulator 104 is configured by a next candidate parameter setting selected from the candidate parameter settings PS_1-PS_N to perform signal demodulation upon the received communication signal S_TUNED again; and when the demodulator 104 configured by the current candidate parameter setting fails to accomplish the signal demodulation within the time-out period TS and the detection result indicates that there is narrow-band interference detected, the control module 110 adjusts the current time-out period TS (e.g., T1), and allows the demodulator 104 configured by the current candidate parameter setting to continue signal reception with the same parameter setting until the adjusted time-out period TS (e.g., T2, where T2>T1) is time-out. In other words, with the help of the increased time-out period, the demodulator 104 has more time to try accomplishing signal demodulation by using the current candidate parameter setting. Thus, the possibility of successful signal reception of a selected channel under a hostile environment is increased, leading to improved receiving robustness of the signal receiver (e.g., a digital cable TV receiver).

Figure 2:
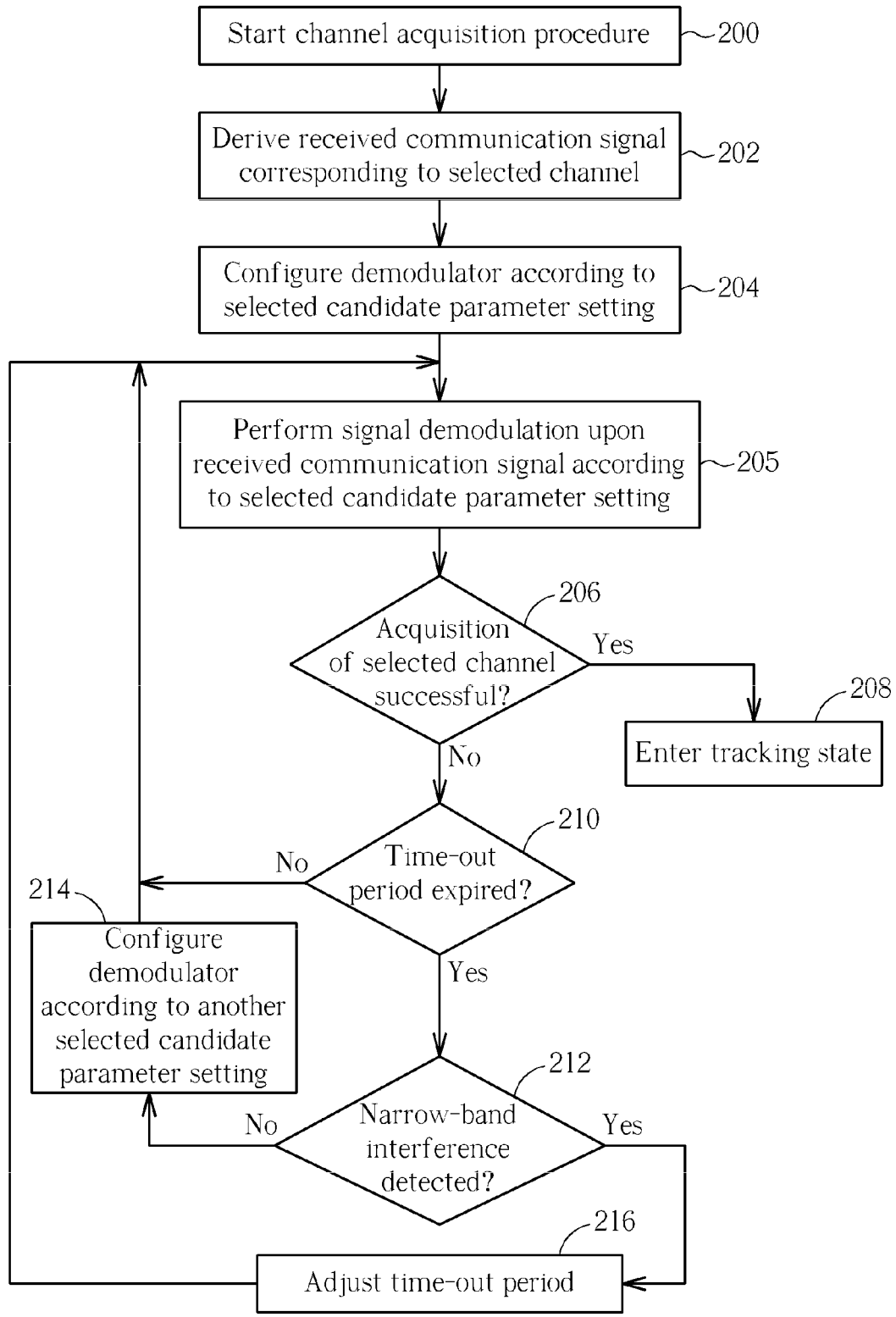
FIG. 2 is a flowchart illustrating a first exemplary signal receiving method which employs a proposed adjustable time-out mechanism.

Please refer to FIG. 2, which is a flowchart illustrating a first exemplary signal receiving method which employs a proposed adjustable time-out mechanism. The first exemplary signal receiving method is employed by the signal receiver 100 shown in FIG. 1. If the result is substantially the same, the steps are not required to be executed in the exact order shown in FIG. 2. The operation of the first exemplary signal receiving method supporting the adjustable time-out mechanism can be briefly summarized using the following steps:

Step 200: The signal receiver 100 starts a channel acquisition procedure in response to a channel change/channel scan operation under a current reception condition with or without the existence of narrow-band interference.

Step 202: The tuner 102 is tuned to a selected frequency for deriving the received communication signal S_TUNED of a selected channel (selected TV channel) from the incoming communication signal S_IN.

Step 204: The control module 110 configures the demodulator 104 according to a current candidate parameter setting (e.g., PSI) selected from a plurality of predefined candidate parameter settings PS_1-PS_N, where the selected candidate parameter setting may include the bandwidth for carrier recovery, the QAM-order for the equalization, etc.

Step 205: The demodulator 104 performs signal demodulation upon the received communication signal S_TUNED of the selected channel according to the selected candidate parameter setting.

Step 206: Is the acquisition of the selected channel (i.e., the signal demodulation of the received communication signal S_TUNED) successful? If yes, go to step 208; otherwise, go to step 210.

Step 208: The signal receiver 100 enters a tracking state to smoothly decode the video/audio contents (TV program contents) transmitted via the selected channel.

Step 210: The control module 110 checks if the time-out period (e.g., T1) is expired. If yes, go to step 212; otherwise, return to step 205.

Step 212: The control module 110 checks if there is narrow-band interference by referring to the detection result S_NI generated from the narrow-band interference detector 108. If yes, go to step 216; otherwise, go to step 214.

Step 214: The control module 110 configures the demodulator 104 according to a next candidate parameter setting (e.g., PS_2) selected from the predefined candidate parameter settings PS_1-PS_N, where the selected candidate parameter setting may include the bandwidth for carrier recovery, the QAM-order for the equalization, etc. The flow proceeds with step 205.

Step 216: The control module 110 replaces the current time-out period (e.g., T1) with an adjusted time-out period (e.g., T2, where T2>T1). The flow proceeds with step 205.

As a person skilled in the art can readily understand the operation of each step shown in FIG. 2 after reading above paragraphs directed to the exemplary embodiment shown in FIG. 1, further description is omitted here for the sake of brevity.

In addition to changing the time-out period setting in response to the expiration of the current (default) time-out period and the detection of the presence of narrow-band interference, the control module 110 may modify parameter(s) of the current parameter setting used by the demodulator 104. By way of example, but not limitation, the control module 110 refers to the detection result S_NI generated from the narrow-band interference detector 108 to selectively adjust an equalizer parameter setting of the equalizer 112 implemented in the demodulator 104. Specifically, the control module 110 is operative to adjust the equalizer parameter setting of the equalizer 112 when the detection result S_NI indicates that there is narrow-band interference detected, where the adjusted equalizer parameter setting may include at least a step size of the equalizer 112. For instance, the step size of the equalizer 112 is increased to speed up the equalizer coefficient convergence.

Figure 3:
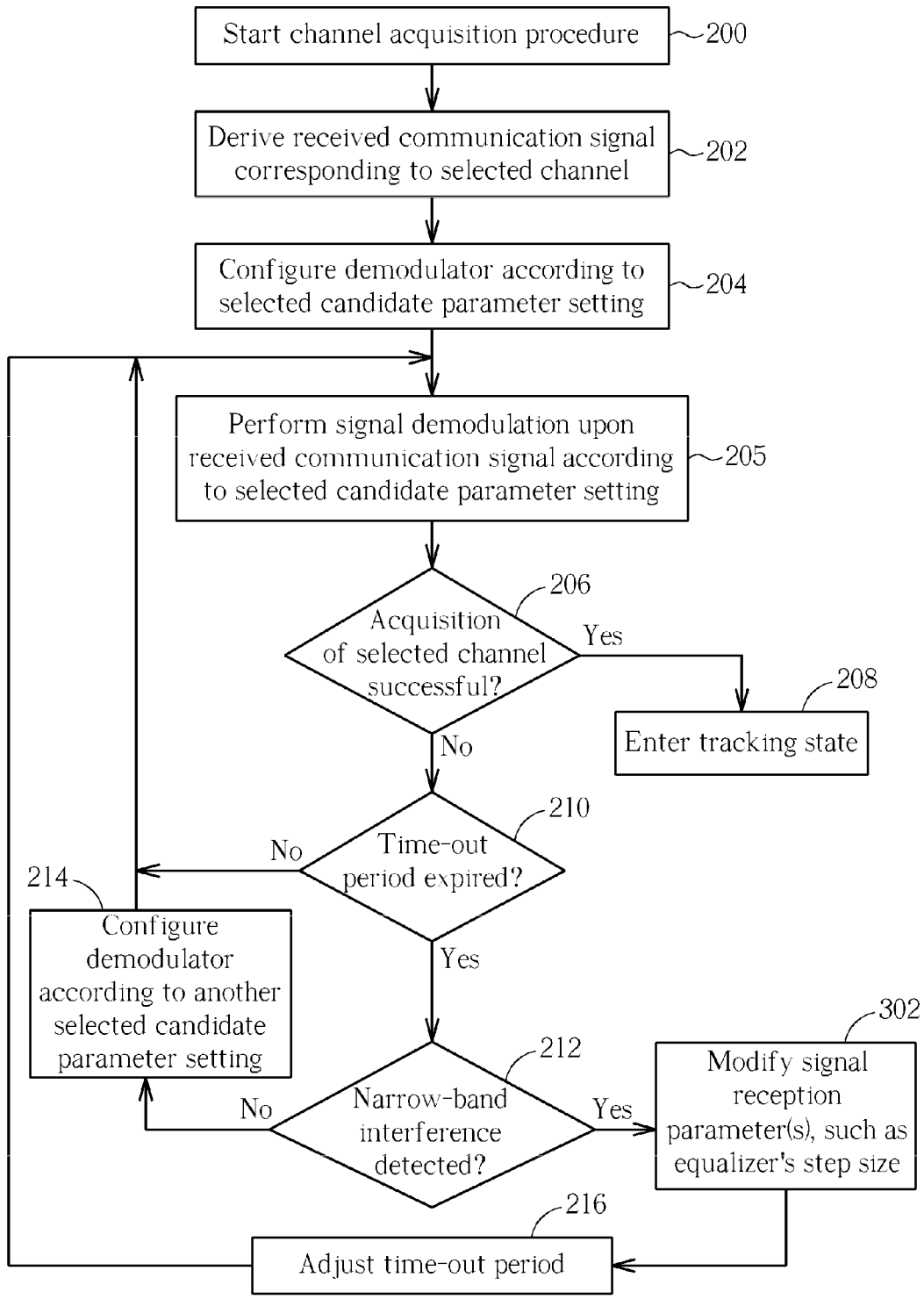
FIG. 3 is a flowchart illustrating a second exemplary signal receiving method which employs a proposed adjustable time-out mechanism.

Please refer to FIG. 3, which is a flowchart illustrating a second exemplary signal receiving method which employs a proposed adjustable time-out mechanism. The second exemplary signal receiving method is employed by the signal receiver 100 shown in FIG. 1. Similarly, if the result is substantially the same, the steps are not required to be executed in the exact order shown in FIG. 3. The major difference between the second exemplary signal receiving method in FIG. 3 and the first exemplary signal receiving method in FIG. 2 is the parameter modification step (i.e., step 302) introduced for modifying signal reception parameter(s), such as the equalizer's step size. As a person skilled in the art can readily understand the operation of each step shown in FIG. 3 after reading above paragraphs, further description is omitted here for the sake of brevity.

It should be noted that the flow shown in FIG. 3 performs step 302 as well as step 216 in response to the expiration of the time-out period (step 210) and the detection of the presence of narrow-band interference (step 212). However, step 216 in FIG. 3 may be omitted, and such an alternative design also falls within the scope of the present invention.

Figure 4:
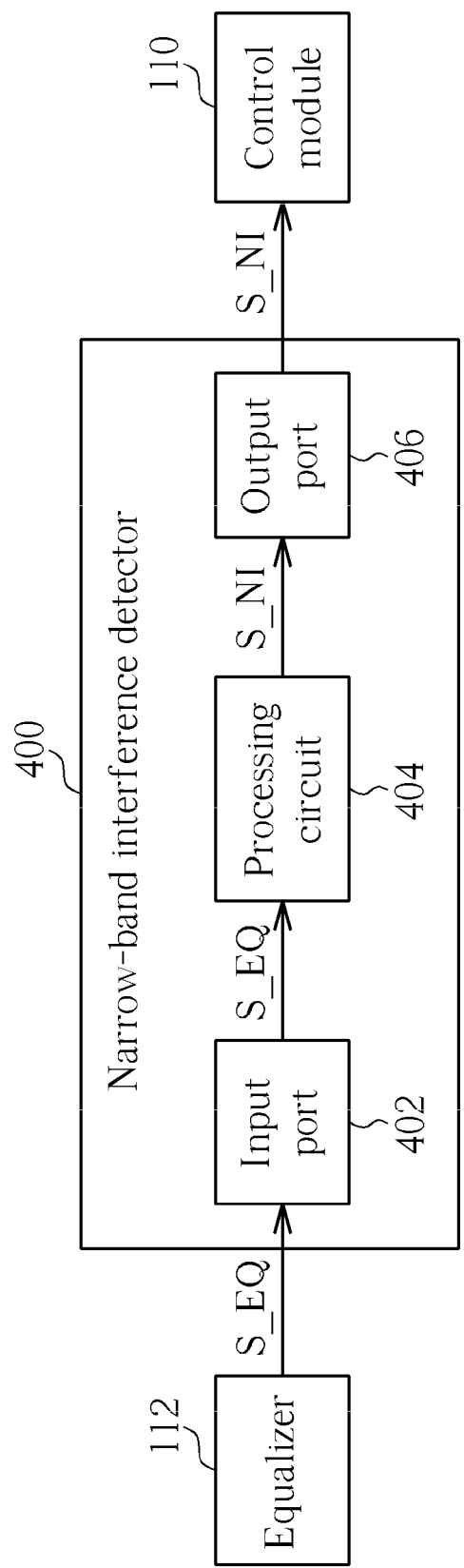
FIG. 4 is a block diagram illustrating an exemplary implementation of the narrow-band interference detector shown in FIG. 1.

To optimize the signal reception performance of the signal receiver 100 which employs the proposed time-out mechanism for dynamically adjusting the time-out period setting according to the detection result of narrow-band interference, a reliable narrow-band interference detector which can detect the existence of narrow-band interference under a variety of possible reception conditions is desired. FIG. 4 is a block diagram illustrating an exemplary implementation of a narrow-band interference detector according to the present invention. The narrow-band interference detector 400 can be adopted to realize the narrow-band interference detector 108 shown in FIG. 1, and includes, but is not limited to, an input port (input node) 402 coupled to the equalizer 112 shown in FIG. 1, a processing circuit 404 coupled to the input port 402, and an output port (output node) 406 coupled between the processing circuit 404 and the control module 110 shown in FIG. 1. The input port 402 receives a signal S_EQ generated from the equalizer 112. Next, the processing circuit 404 performs narrow-band interference detection according to the signal S_EQ received by the input port 402, and accordingly generates the detection result S_NI. In the end, the output port 406 outputs the detection result S_NI to the control module 110 for informing the control module 110 of the presence of narrow-band interference. In one exemplary implementation, the signal S_EQ generated from the equalizer 112 is an error signal indicative of a difference between an equalization result and a decision result derived from the equalization result. As the equalization result may include the desired signal component and the undesired narrow-band interference component, and the decision result ideally includes the desired signal component only, the error signal between the equalization result and the decision result would contain information of the undesired narrow-band interference component. Based on such an observation, the narrow-band interference detector 400 therefore processes the error signal produced from the equalizer 112 to generate a more reliable detection result. However, using the error signal of the equalizer 112 to act as the input of the narrow-band interference detector 400 merely serves as one possible implementation of the present invention, and is not meant to be a limitation to the scope of the present invention. That is, any detector which detects the narrow-band interference according to a signal provided by the equalizer falls within the scope of the present invention.

By way of example, but not limitation, the processing circuit 404 may generate the detection result S_IN by performing a frequency-domain analysis upon a collection of the time-domain signal (i.e., S_EQ) generated from the equalizer 112. More specifically, the processing circuit 404 transforms the time-domain signal S_EQ to frequency domain, for example, by a fast Fourier transform (FFT), and then obtains a peak-to-average value based on the signal spectrum in the frequency domain. After obtaining the peak-to-average value, the processing circuit 404 compares the peak-to-average value with a threshold value to generate the detection result S_IN indicative of the presence of narrow-band interference. Please refer to FIG. 5, which is a spectrum diagram of a fast Fourier transform result of the signal S_EQ generated from the equalizer 112. The peak amplitude value $A_{peak}$ is selected from amplitudes of the signal components at different frequencies, and then an average amplitude value $A_{avg}$ is derived from amplitudes of these signal components. When the peak-to-average value (i.e., $A_{peak}/A_{avg}$) exceeds the threshold value (e.g., 5), the processing circuit 404 sets the detection result S_NI to inform the control module 110 of the existence of narrow-band interference. It should be noted that the above exemplary frequency-domain analysis flow is for illustrative purposes only. Other frequency-domain analysis methodology can be employed for processing the signal S_EQ for generating the detection result S_IN. This also falls within the scope of the present invention.

Please note that using the narrow-band interference detector 400 in FIG. 4 to realize the narrow-band interference detector 108 in the signal receiver 100 in FIG. 1 is merely one feasible application of the narrow-band interference detector 400. Actually, the narrow-band interference detector 400 can be applied to any application which requires a reliable detection of narrow-band interference. Moreover, using the narrow-band interference detector 400 in the signal receiver 100 shown in FIG. 1 for providing a reliable detection of narrow-band interference is not meant to be a limitation to the scope of the present invention. Any signal receiver referring to a narrow-band interference detection result to adjust the demodulation configuration/parameter setting obeys the spirit of the present invention.

Those skilled in the art will readily observe that numerous modifications and alterations of the device and method may be made while retaining the teachings of the invention.

What is claimed is:

1. A signal receiver, comprising:
    a demodulator, for performing signal demodulation upon a received communication signal;
    a narrow-band interference detector, for performing narrow-band interference detection and accordingly generating a detection result; and
    a control module, coupled to the demodulator and the narrow-band interference detector, for controlling an operation of the demodulator according to the detection result.

2. The signal receiver of claim 1, wherein the control module configures the demodulator according to a current candidate parameter setting selected from a plurality of candidate parameter settings, and allows the demodulator configured by the current candidate parameter setting to accomplish signal demodulation within a time-out period; and when the demodulator configured by the current candidate parameter setting fails to accomplish signal demodulation within the time-out period, the control module selectively adjusts the time-out period according to the detection result.

3. The signal receiver of claim 2, wherein when the demodulator configured by the current candidate parameter setting fails to accomplish the signal demodulation within the time-out period and the detection result indicates that there is no narrow-band interference, the demodulator is configured by a next candidate parameter setting selected from the candidate parameter settings to perform signal demodulation upon the received communication signal; and when the demodulator configured by the current candidate parameter setting fails to accomplish signal demodulation within the time-out period and the detection result indicates that there is narrow-band interference, the control module adjusts the time-out period, and allows the demodulator configured by the current candidate parameter setting to accomplish signal demodulation within the adjusted time-out period.

4. The signal receiver of claim 1, wherein the demodulator comprises an equalizer, and the control module refers to the detection result to selectively adjust an equalizer parameter setting of the equalizer.

5. The signal receiver of claim 4, wherein the control module is operative to adjust the equalizer parameter setting of the equalizer when the detection result indicates that there is narrow-band interference, where the adjusted equalizer parameter setting includes at least a step size of the equalizer.

6. The signal receiver of claim 1, wherein the demodulator comprises an equalizer, and the narrow-band interference detector comprises:
    an input port, coupled to the equalizer, for receiving a signal generated from the equalizer;
    a processing circuit, coupled to the input port, for performing narrow-band interference detection according to the signal generated from the equalizer, and accordingly generating the detection result; and
    an output port, coupled to the control module and the processing circuit, for outputting the detection result to the control module.

7. The signal receiver of claim 6, wherein the signal generated from the equalizer is an error signal indicative of a difference between an equalization result and a decision result derived from the equalization result.

8. The signal receiver of claim 6, wherein the processing circuit generates the detection result by performing a frequency-domain analysis upon the signal generated from the equalizer.

9. The signal receiver of claim 8, wherein the processing circuit transforms the signal generated from the equalizer into a frequency domain for obtaining a peak-to-average value, and compares the peak-to-average value with a threshold value to generate the detection result.

10. A narrow-band interference detector, comprising:
    an input port, coupled to an equalizer, for receiving a signal generated from the equalizer; and
    a processing circuit, coupled to the input port, for performing narrow-band interference detection according to the signal generated from the equalizer, and accordingly generating a detection result.

11. The narrow-band interference detector of claim 10, wherein the signal generated from the equalizer is an error signal indicative of a difference between an equalization result and a decision result derived from the equalization result.

12. The narrow-band interference detector of claim 10, further comprising:
    an output port, coupled to the processing circuit and a control module utilized for controlling an operation of a demodulator having the equalizer included therein, for outputting the detection result to the control module.

13. The narrow-band interference detector of claim 10, wherein the processing circuit generates the detection result by performing a frequency-domain analysis upon the signal generated from the equalizer.

14. The narrow-band interference detector of claim 13, wherein the processing circuit transforms the signal generated from the equalizer into a frequency domain for obtaining a peak-to-average value, and compares the peak-to-average value with a threshold value to generate the detection result.

15. A signal receiving method, comprising:
    utilizing a demodulator to perform signal demodulation upon a received communication signal;
    performing narrow-band interference detection and accordingly generating a detection result; and
    controlling an operation of the demodulator according to the detection result.

16. The signal receiving method of claim 15, wherein the step of controlling the operation of the demodulator comprises:
    configuring the demodulator according to a current candidate parameter setting selected from a plurality of candidate parameter settings, and allowing the demodulator configured by the current candidate parameter setting to accomplish signal demodulation within a time-out period; and
    when the demodulator configured by the current candidate parameter setting fails to accomplish signal demodulation within the time-out period, selectively adjusting the time-out period according to the detection result.

17. The signal receiving method of claim 16, wherein when the demodulator configured by the current candidate parameter setting fails to accomplish signal demodulation within the time-out period and the detection result indicates that there is no narrow-band interference, the demodulator is configured by a next candidate parameter setting selected from the candidate parameter settings to perform the signal demodulation upon the received communication signal; and when the demodulator configured by the current candidate parameter setting fails to accomplish signal demodulation within the time-out period and the detection result indicates that there is narrow-band interference, the time-out period is adjusted, and the demodulator configured by the current candidate parameter setting is allowed to accomplish signal demodulation within the adjusted time-out period.

18. The signal receiving method of claim 15, wherein the demodulator comprises an equalizer, and the step of controlling the operation of the demodulator comprises:
referring to the detection result to selectively adjust an equalizer parameter setting of the equalizer.

19. The signal receiving method of claim 18, wherein the step of referring to the detection result to selectively adjust the equalizer parameter setting of the equalizer comprises:
adjusting the equalizer parameter setting of the equalizer when the detection result indicates that there is narrow-band interference, where the adjusted equalizer parameter setting includes at least a step size of the equalizer.

20. The signal receiving method of claim 15, wherein the demodulator comprises an equalizer; and the step of performing the narrow-band interference detection and accordingly generating the detection result comprises:
receiving a signal generated from the equalizer; and
generating the detection result by performing the narrow-band interference detection according to the signal generated from the equalizer.

21. The signal receiving method of claim 20, wherein the signal generated from the equalizer is an error signal indicative of a difference between an equalization result and a decision result derived from the equalization result.

22. The signal receiving method of claim 20, wherein the step of performing the narrow-band interference detection according to the signal generated from the equalizer and accordingly generating the detection result comprises:
performing a frequency-domain analysis upon the signal generated from the equalizer to generate the detection result.

23. The signal receiving method of claim 22, wherein the step of performing the frequency-domain analysis upon the signal generated from the equalizer comprises:
transforming the signal generated from the equalizer into a frequency domain to obtain a peak-to-average value; and
comparing the peak-to-average value with a threshold value to generate the detection result.

24. A method for detecting narrow-band interference, comprising:
receiving a signal generated from an equalizer; and
performing narrow-band interference detection according to the signal generated from the equalizer and accordingly generating a detection result.

25. The method or of claim 24, wherein the signal generated from the equalizer is an error signal indicative of a difference between an equalization result and a decision result derived from the equalization result.

26. The method of claim 24, further comprising:
outputting the detection result to a control module which is utilized for controlling an operation of a demodulator having the equalizer included therein.

27. The method of claim 24, wherein the step of performing the narrow-band interference detection according to the signal generated from the equalizer and accordingly generating the detection result comprises:
performing a frequency-domain analysis upon the signal generated from the equalizer to generate the detection result.

28. The method of claim 27, wherein the step of performing the frequency-domain analysis upon the signal generated from the equalizer to generate the detection result comprises:
transforming the signal generated from the equalizer into a frequency domain for obtaining a peak-to-average value; and
comparing the peak-to-average value with a threshold value to generate the detection result.

* * * * *